(12) United States Patent
Naidu et al.

(10) Patent No.: US 8,141,500 B2
(45) Date of Patent: Mar. 27, 2012

(54) PLASTIC PALLET WITH SLEEVED REINFORCING RODS AND ASSOCIATED METHOD FOR MAKING THE SAME

(75) Inventors: Vishnu Naidu, Windermere, FL (US); Ken Brandt, Orlando, FL (US)

(73) Assignee: Chep Technology Pty Limited, Sydney (AU)

(*) Notice: Subject to any disclaimer, the term of this patent is extended or adjusted under 35 U.S.C. 154(b) by 221 days.

(21) Appl. No.: 12/056,613

(22) Filed: Mar. 27, 2008

(65) Prior Publication Data
US 2008/0236454 A1 Oct. 2, 2008

Related U.S. Application Data

(60) Provisional application No. 60/909,094, filed on Mar. 30, 2007.

(51) Int. Cl.
*B65D 19/12* (2006.01)
(52) U.S. Cl. .................. 108/56.3; 108/57.25
(58) Field of Classification Search ............. 108/57.25, 108/56.1, 56.3, 51.11, 901, 902
See application file for complete search history.

(56) References Cited

U.S. PATENT DOCUMENTS

| | | | |
|---|---|---|---|
| 2,752,637 A | 7/1956 | Walker et al. | |
| 3,803,670 A | 4/1974 | Johnson | 24/73 |
| 3,832,955 A * | 9/1974 | Pottinger et al. | 108/57.27 |
| 4,145,976 A * | 3/1979 | Svirklys | 108/56.1 |
| 4,602,499 A | 7/1986 | Norton et al. | 73/41 |
| 4,735,154 A * | 4/1988 | Hemery | 108/56.1 |
| 5,413,052 A * | 5/1995 | Breezer et al. | 108/56.1 |
| 5,483,899 A * | 1/1996 | Christie | 108/56.3 |
| 5,791,262 A | 8/1998 | Knight et al. | 108/57.25 |
| 5,868,080 A | 2/1999 | Wyler et al. | 108/57.25 |
| 5,887,529 A * | 3/1999 | John et al. | 108/56.1 |
| 6,021,721 A | 2/2000 | Rushton | |
| 6,199,488 B1 | 3/2001 | Favaron et al. | 108/57.25 |
| 6,564,725 B2 | 5/2003 | Hale | 108/57.25 |
| 6,622,642 B2 * | 9/2003 | Ohanesian | 108/57.25 |
| 6,648,715 B2 | 11/2003 | Wiens et al. | 446/121 |
| 6,955,128 B2 | 10/2005 | Apps | 108/57.25 |
| 6,955,129 B2 * | 10/2005 | Moore et al. | 108/57.25 |
| 2004/0255828 A1 * | 12/2004 | Markling et al. | 108/57.25 |
| 2005/0129901 A1 * | 6/2005 | Swindler et al. | 428/76 |
| 2007/0256609 A1 | 11/2007 | Naidu et al. | 108/108 |

FOREIGN PATENT DOCUMENTS

EP 400640 * 12/1990

* cited by examiner

*Primary Examiner* — Jose V Chen
*Assistant Examiner* — Matthew Ing
(74) *Attorney, Agent, or Firm* — Allen, Dyer, Doppelt, Milbrath & Gilchrist, P.A.

(57) ABSTRACT

A pallet includes an upper and lower deck. The upper deck includes first joining members that project downwardly from the upper deck, with each first joining member including an outer sleeve. The lower deck includes second joining members that project upwardly from the lower deck, with second joining member including an inner sleeve. At least one of the upper and lower decks includes channels between top and bottom surfaces thereof, with each channel extending from a side edge to an opposing side edge of the corresponding deck. Sleeved reinforcing rods are in the channels. Each sleeved reinforcing rod includes a reinforcing rod having opposing ends and side surfaces therebetween, and a sleeve enclosing the side surfaces of the reinforcing rod, with there being relative movement between the sleeve and the reinforcing rod. The inner sleeves of the second joining members receive the outer sleeves of the first joining members to define a plurality of support blocks joining the upper and lower decks.

17 Claims, 8 Drawing Sheets

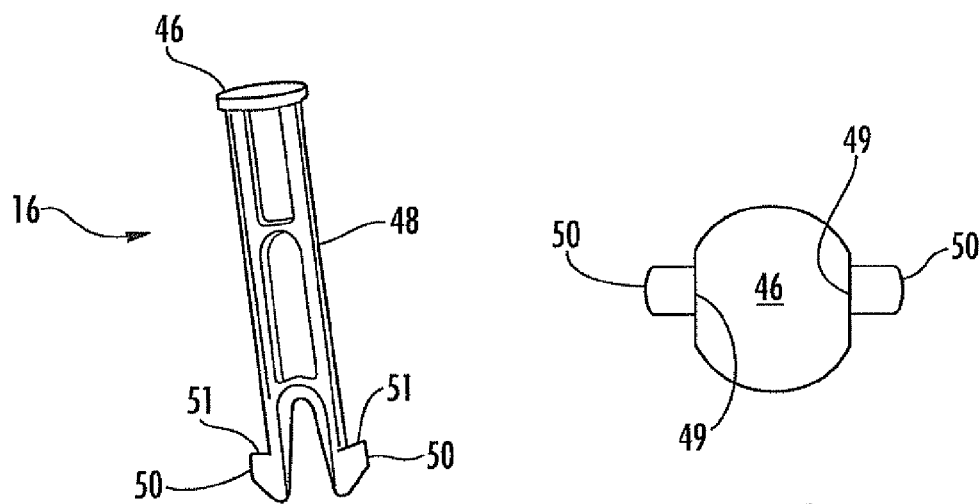
FIG. 5
FIG. 6
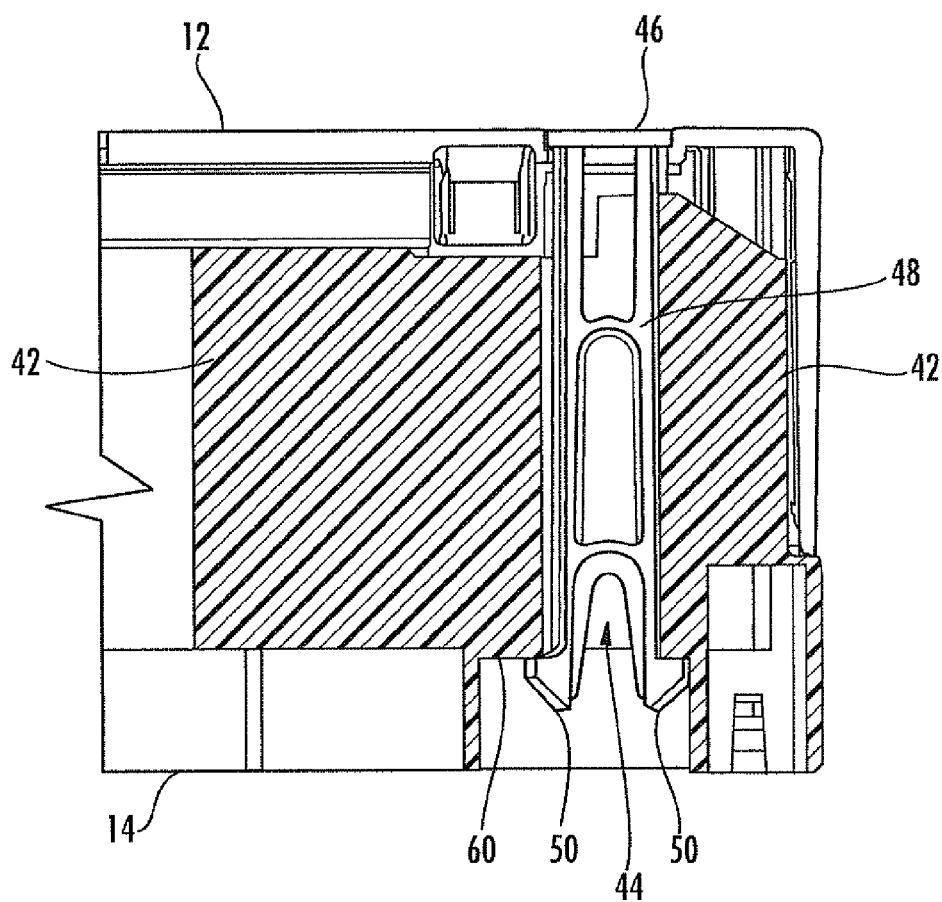
FIG. 7

PLASTIC PALLET WITH SLEEVED REINFORCING RODS AND ASSOCIATED METHOD FOR MAKING THE SAME

RELATED APPLICATION

This application claims the benefit of U.S. Provisional Application 60/909,094 filed Mar. 30, 2007, the entire contents of which are incorporated herein by reference.

FIELD OF THE INVENTION

The present invention relates to the field of pallets useful in material handling, and more particularly, to a multi-piece plastic pallet designed for use with forklift equipment.

BACKGROUND OF THE INVENTION

Pallets are customarily used to transport and store goods. A pallet typically includes an upper deck and a lower deck separated by support blocks. Pallets have traditionally been formed of wood. While advantageous in terms of cost, wood pallets have many disadvantages. For example, they are subject to breakage and are therefore reusable only over a short period of time. Wooden pallets are also difficult to maintain in a sanitary condition, thereby limiting their usability in applications where sanitation is important, such as in food handling applications.

With the growth of the plastics industry a wide variety of plastics have been investigated to determine their suitability for use in producing pallets. Plastic pallets can easily be molded and are stronger and lighter weight than wooden pallets. They can also be made with recyclable materials. Furthermore, plastic pallets are more durable than wooden pallets.

To increase the durability of plastic pallets, reinforcing elements or rods have been used. For example, U.S. Pat. No. 6,199,488 discloses a reinforced plastic pallet comprising an upper deck formed of a plastic material having a first coefficient of thermal expansion, and a lower deck formed of a plastic material having substantially the first coefficient of thermal expansion. The lower deck includes a plurality of channels formed in its upper surface, and a plurality of reinforcing elements having a second coefficient of thermal expansion different from the first degree of expansion are in the plurality of channels. The channels are provided with retainers to retain the reinforcing elements therein.

U.S. Pat. No. 5,868,080 discloses a reinforced plastic pallet with reinforcing rods. At least some of the reinforcing rods have an exposed surface at a top surface of the pallet. In addition to functioning as a reinforcing member, the exposed surfaces of the reinforcing rods comprise an anti-skid surface for maintaining positioning of a payload on the pallet.

Yet another approach to increase the durability of plastic pallets is disclosed in U.S. Pat. No. 4,735,154. The '154 patent provides a reinforced loading pallet comprising two essentially rectangular matching panels one superposed over the other, with each panel having a rigid frame including ties equipped with hollow, polygonal feet arranged at four outer corners of the frame. At least some of the ties in at least one of the frames are provided with channels, with at least some of the channels intersecting in a single plane. Rods are inserted into the channels for reinforcing the pallet.

While plastic pallets offer several advantages over wood pallets, there is still a demand to increase durability and strength of plastic pallets.

SUMMARY OF THE INVENTION

In view of the foregoing background, an object of the present invention is to increase the durability of plastic pallets.

This and other objects, advantages and features in accordance with the present invention are to provide a plastic pallet comprising an upper and lower deck. A plurality of first joining members may project downwardly from the upper deck, with each first joining member including an outer sleeve. A plurality of second joining members may project upwardly from the lower deck, with each second joining member including an inner sleeve. At least one of the upper and lower decks may include a plurality of channels between top and bottom surfaces thereof, with each channel extending from a side edge to an opposing side edge of the corresponding deck.

A plurality of sleeved reinforcing rods may be in the plurality of channels. Each sleeved reinforcing rod may comprise a reinforcing rod having opposing ends and side surfaces therebetween, and a sleeve enclosing the side surfaces of the reinforcing rod. There is preferably relative movement between the sleeve and the reinforcing rod. The inner sleeves of the second joining may members receive the outer sleeves of the first joining members to define support blocks joining the upper and lower decks.

The channels may be in the lower deck only, in the upper deck only, or in both the upper and lower decks. When the sleeved reinforcing rods are in both decks, the sleeved reinforcing rods in the upper deck may be orthogonal to the sleeved reinforcing rods in the lower deck. All of the sleeved reinforcing rods in a same deck may be co-planar and parallel to one another.

The sleeved reinforcing rods are inserted into upper and/or lower deck molds before the upper and lower decks are formed. The sleeved reinforcing rods are thus insert molded. Plastic pallet manufacturers typically add reinforcing rods to a pallet after the pallet is formed. This requires the pallet to be molded first, and then add the reinforcing rods. In accordance with the present invention, the sleeved reinforcing rods are inserted into the pallet mold.

The plastic of the sleeve may have a melting point that is slightly higher than the melting point of the plastic used to form the upper and lower decks. As a result, the outside surface of the sleeves will partially melt or bond to the plastic of the upper and lower decks while still allowing movement of the reinforcing rods therein. Alternatively, the melting point of the sleeve may be the same as the melting point of the upper and lower decks, but cooling characteristics of the molten plastic during manufacturing may still result in the outside surface of the sleeves partially melting or bonding to the plastic of the upper and lower decks layers without melting down to the reinforcing rods.

Each reinforcing rod may be hollow so that an opening extends between the opposing open ends thereof. The plastic pallet may further comprise a plurality of end caps inserted into the open ends of the reinforcing rods. Each reinforcing rod may comprise fluorine-containing polymers to assist with the relative movement with its sleeve.

The upper deck may further include a plurality of snap-pin openings, with each outer sleeve projecting downwardly from the upper deck surrounding a respective snap-pin opening. Each second joining member projecting upwardly from the lower deck may include a snap-pin receiving cavity positioned therein. Snap-pins may be inserted may be into the snap-pin openings in the upper deck, with each snap-pin extending through the snap-pin receiving cavity for engaging a backside of the inner sleeve associated therewith.

Another aspect is directed to a method for making a pallet as described above. The method may comprise forming a plurality of sleeved reinforcing rods, with each sleeved reinforcing rod comprising a reinforcing rod having opposing ends and side surfaces therebetween, and a sleeve enclosing the side surfaces of the reinforcing rod. There is relative movement between the sleeve and the reinforcing rod. The method may further comprise providing respective molds for the upper and lower decks, and positioning the sleeved reinforcing rods in the respective decks. The upper and lower decks including their respective first and second joining members are formed. The inner sleeves of the second joining members may be positioned for receiving the outer sleeves of the first joining members to define the support blocks joining the upper and lower decks.

BRIEF DESCRIPTION OF THE DRAWINGS

FIG. 5 is a perspective view of a snap-pin used within each support block in accordance with the present invention.

FIG. 6 is a top view of the snap-pin shown in FIG. 5.

FIG. 7 is a partial cross-sectional side view of a pallet illustrating a snap-pin within a support block in accordance with the present invention.

DETAILED DESCRIPTION OF THE PREFERRED EMBODIMENTS

Figure 1:
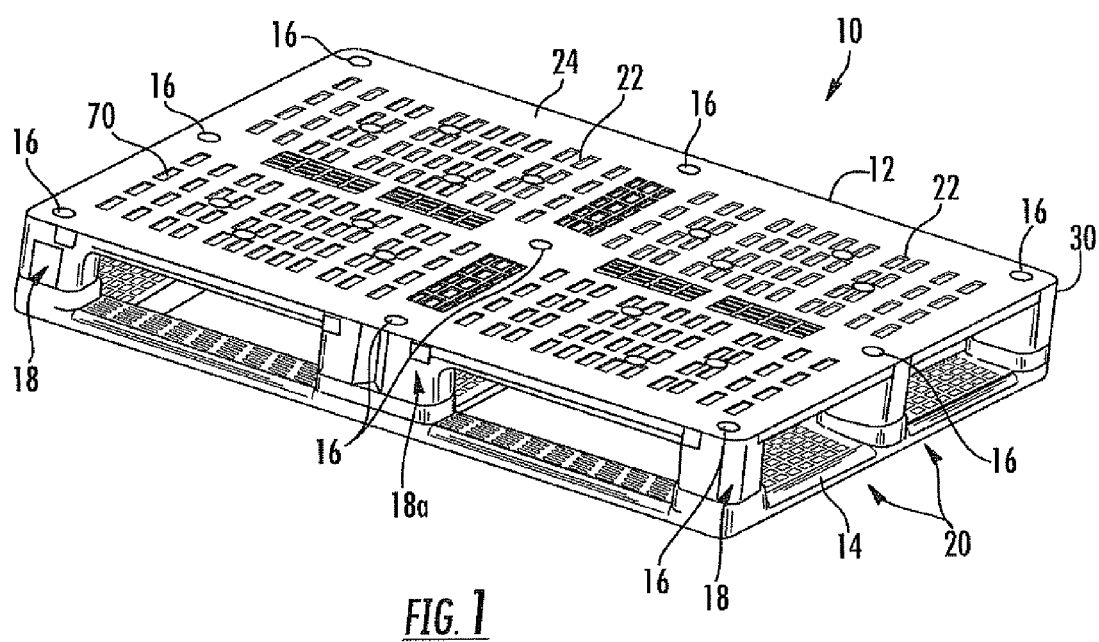
FIG. 1 is a top perspective view of an assembled pallet in accordance with the present invention.
Figure 2:
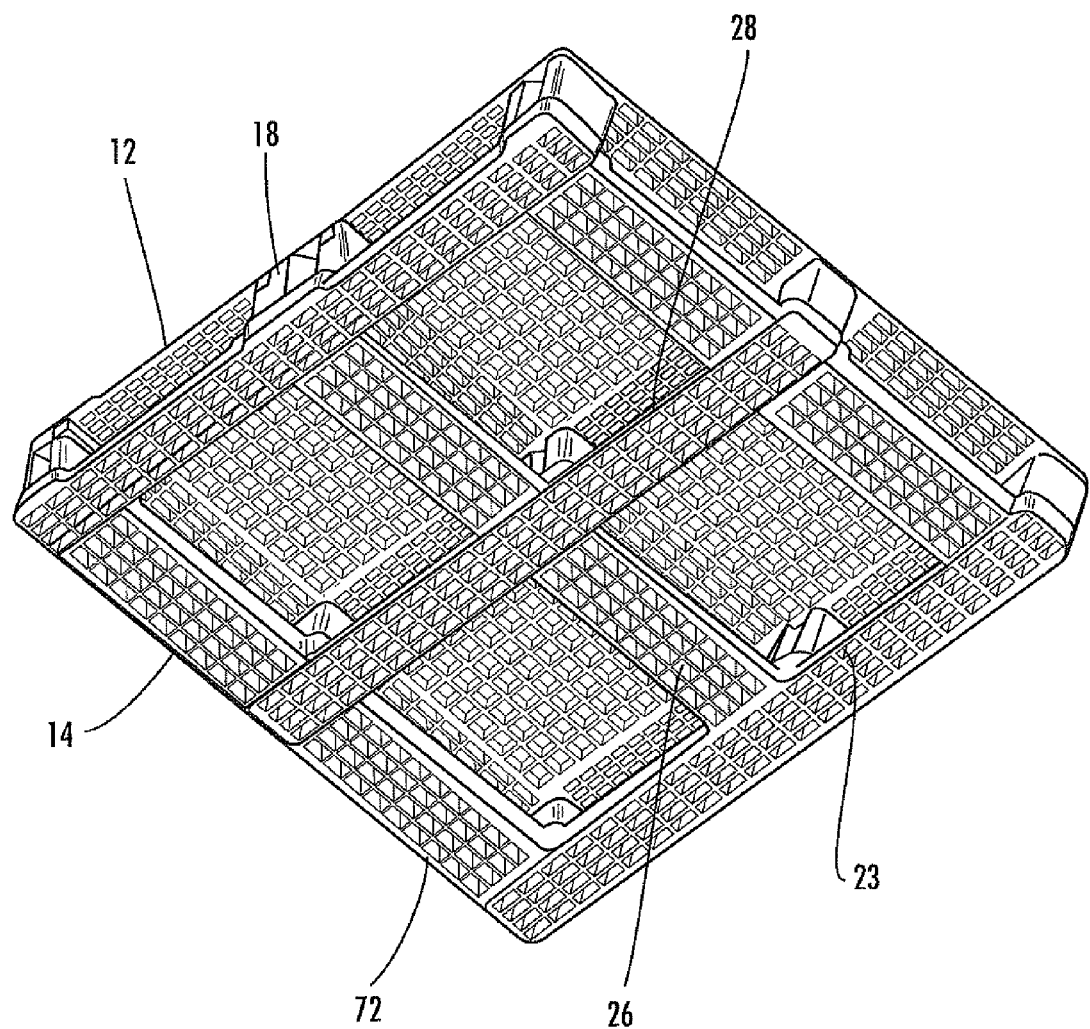
FIG. 2 is a bottom perspective view of the pallet shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

FIGS. 1-4 illustrate top and bottom perspective views of a pallet 10 having upper and lower decks 12, 14 that are held together using snap-pins 16. The upper deck 12 is also known as the cargo layer, and the lower deck 14 is also known as the base layer.

The upper deck 12 includes a plurality of first joining members that project downwardly from the upper deck, with each first joining member including an outer sleeve 40. The lower deck 14 includes a plurality of second joining members that project upwardly from the lower deck, with each second joining member including an inner sleeve 42. The inner sleeves 42 of the second joining members receive the outer sleeves 40 of the first joining members to define support blocks 18, 18a joining the upper and lower decks 12, 14.

The support blocks 18, 18a define a space 20 between the upper and lower decks 12, 14 for receiving at least one lifting member, such as a tine of a pallet jack. An advantage of the snap-pins 16 is that they act as fusible links in the event a separation force is applied between the upper and lower decks 12, 14 of the pallet 10. This separation force may result when the wheels of the pallet jack are resting on the lower layer 14, and the tines extending from the pallet jack are lifted upwards. This causes the upper deck 12 to become separated from the support blocks 18, 18a. The tabs 50 on the fusible links 16 will snap or break when the separation force becomes too excessive. Consequently, instead of replacing the entire upper deck 12, the snap-pins 16 with the broken tabs 50 are replaced.

As will be discussed in greater detail below, the support blocks 18, 18a are formed by the outer and inner sleeves 40, 42 extending from the respective upper and lower decks 12, 14. The outer and inner sleeves 40, 42 are molded as part of their respective upper and lower decks 12, 14. However, the upper and lower decks 12, 14 are separately molded.

The upper deck 12 includes a generally flat, planar surface having a plurality of holes 22 extending therethrough. Likewise, the lower deck 14 includes a generally flat, planar surface having a plurality of holes 23 extending therethrough. The holes 22, 23 provide several benefits including a reduced surface area of the upper and lower decks 12, 14, increased air circulation for items placed on the upper deck, and a reduced weight of the pallet, for example. An example plastic pallet with upper and lower decks is disclosed in U.S. published patent application number 2007/0256609. This patent is assigned to the current assignee of the present invention, and is incorporated herein by reference in its entirety.

The upper deck 12 may include an outer perimeter 24 of the planar surface that does not include any holes 12. This area may be about 3 to 5 inches wide, for example. The lower deck 14 has a perimeter shape that substantially matches the perimeter shape of the upper deck 12. The lower deck 14 may include a rectangular perimeter shape having cross members 26, 28 that intersect a center portion of each side of the rectangular perimeter, midway between the corners of the pallet 10.

The upper and lower decks 12, 14 may be molded from thermoplastic or other polymer materials, including high density polyethylene (HDPE), polypropylene (PP), among other polymer materials. As may be appreciated by those skilled in the art, the polymer materials may be filled or unfilled and/or may include particulate or fibrous, natural or synthetic materials, among other features. For example, unfilled HDPE may provide improved impact strength, PP having strengtheners (i.e., long glass fibers) may provide improved structural properties, and unfilled PP with random copolymers may provide improved reinforcement qualities.

The upper and lower decks 12, 14 may be molded from different thermoplastics or polymer materials. For example, the upper deck 12 may be molded from a first type of thermoplastic or polymer material, while the lower deck 12 may be molded from a second type of thermoplastic or polymer material. According to alternative embodiments, all or a portion of the upper and lower decks 12, 14 may be constructed from materials other than plastic, such as wood and/or metal, for example.

The illustrated pallet 10 is substantially square-shaped. An example size of the pallet 10 is 48 inches by 48 inches, for example. As readily appreciated by those skilled in the art, the pallet 10 may also be formed with other rectangular shapes, such as 40 inches by 48 inches, for example. The pallet 10 may include rounded corners/edges 30 along the perimeter thereof. Rounded corners/edges 30 help to reduce and/or deflect damage during impact with the tines of a forklift, as well as providing an improved aesthetic appearance.

The illustrated pallet 10 includes a plurality of support blocks 18, 18a that are provided to join the upper and lower decks 12, 14 together as well as providing separation so that the tines of a pallet jack can be inserted therebetween. For example, the illustrated pallet 10 includes nine support blocks 18, 18a that are located at the corners of the pallet, as well as between the corners of the pallet along the outer edges of the pallet. A support block 18a is also provided in a center of the pallet 10 at the intersection of cross members 26, 28 in the lower deck 14.

Each support block 18, 18a is defined by an outer sleeve 40 projecting downwardly from the upper deck 12 and an inner sleeve 42 projecting upwardly from the lower deck 14. The outer and inner sleeves 40, 42 are molded with their respective upper and lower decks 12, 14. The outer and inner sleeves 40, 42 are sized so that they overlap one another when joined together. The shapes of the outer and inner sleeves 40, 42 are not limited to any particular shape. The outer and inner sleeves 40, 42 may be square-shaped, triangular-shaped, oval-shaped or cross-shaped, for example. The edges of the outer sleeves 40 may be rounded.

The upper deck 12 includes a plurality of snap-pin openings for receiving the snap-pins 16. Each outer sleeve 40 surrounds a respective snap-pin opening. The lower deck 14 includes a snap-pin receiving cavity 44 positioned within each inner sleeve 42. A plurality of radial ribs 43 extending between the snap-pin receiving cavity 44 and the inner sleeve 42.

An advantage of the support blocks 18, 18a is that the impact energy from contact with the tines of the forklift can be dissipated among the following elements: the outer sleeve 40, the inner sleeve 42, the radial ribs 43 and the cylindrical core defined by the snap-pin receiving cavity 44 in the inner sleeve. The fork tines strike the outer sleeve 40 first, which absorbs most of the impact energy. The impact energy may then be transmitted to the inner sleeve 42, which also absorbs some of the impact energy. More absorption of the impact energy takes place at the radial ribs 43. The remaining impact energy reaches the snap-pin receiving cavity 44 for dissipation.

Each snap-pin 16 includes a head 46, a body 48 and spaced apart tips 50, as best illustrated in FIG. 5. The head 46 is for engaging a snap-pin opening in the upper deck 12. The head 46 of each snap-pin 16 may be shaped to include spaced apart straight edges 49, as illustrated in FIG. 6. Each snap-pin opening in the upper deck 12 is correspondingly shaped the same. This helps to hold the snap-pins 16 in place. The snap-pins 16 are typically inserted into the pallet 10 after the upper and lower decks 12, 14 have been joined together to form the support blocks 18, 18a.

The spaced apart tips 50 extend through the snap-pin receiving cavity 44 for engaging a backside 50 of the inner sleeve, as best illustrated in FIG. 7. The snap-pin receiving cavity 44 does not extend all the way from the top of the inner sleeve 42 to the bottom of the lower deck 14. This is to allow room for the tabs 50 on the snap-pin 16 to clear and engage the backside 60 of the inner sleeve 42.

Figure 3:
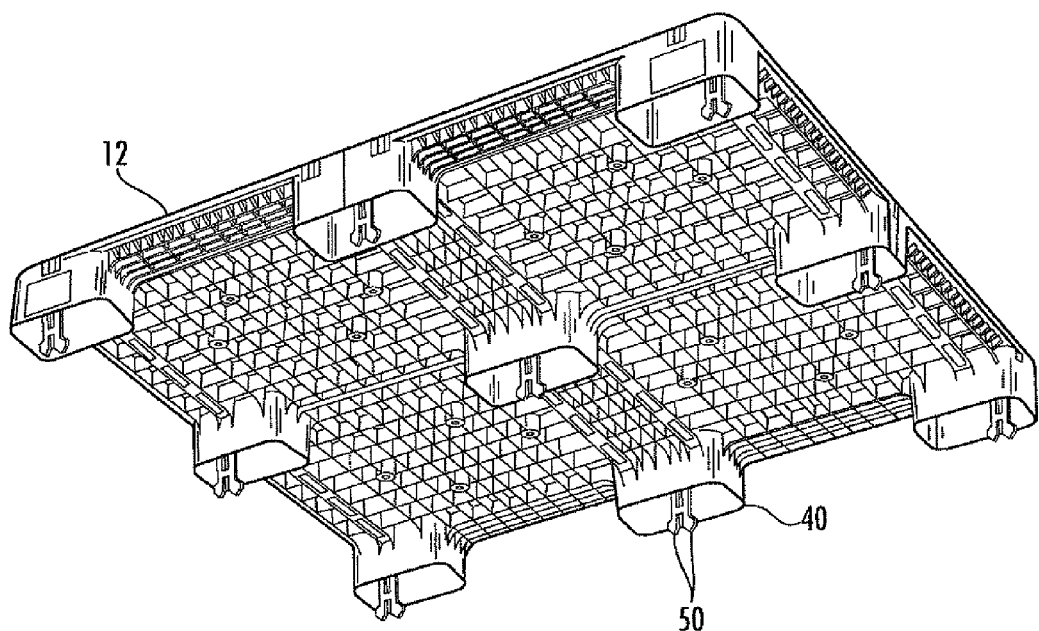
FIG. 3 is a bottom perspective view of the upper deck of the pallet shown in FIG. 1.
Figure 4:
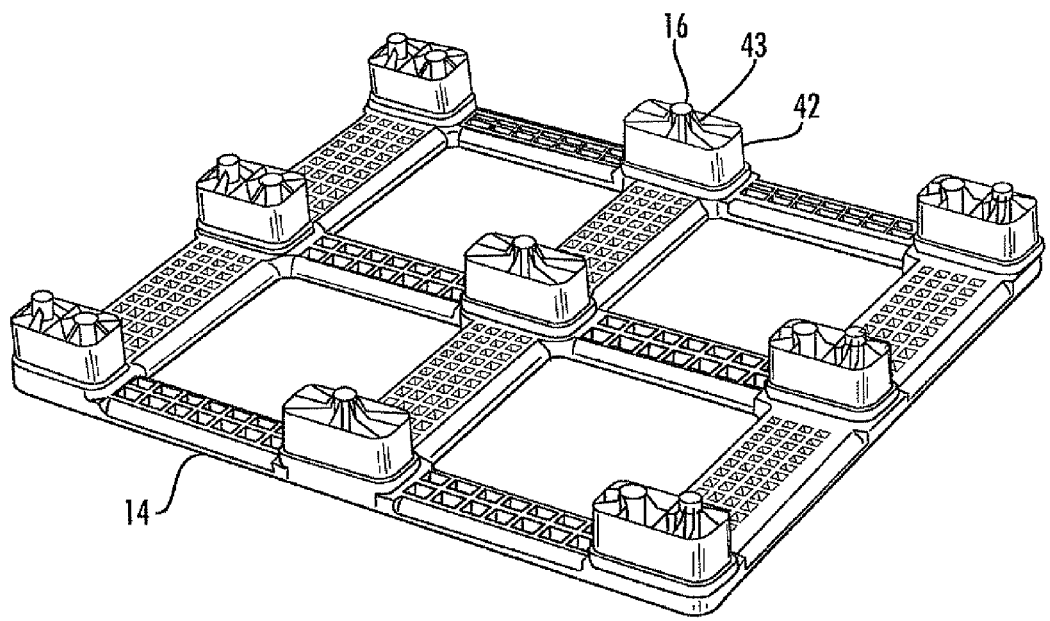
FIG. 4 is a top perspective view of the lower deck of the pallet shown in FIG. 1.

Even though the upper and lower decks 12, 14 are separated in FIGS. 3 and 4, the snap-pins 16 are positioned accordingly for illustration purposes. As illustrated in FIG. 3, the snap-pins 16 extend within and past the outer sleeves 40. As illustrated in FIG. 4, the heads 46 of the snap-pins 16 are raised above the inner sleeve 42 and the snap-pin receiving cavities 44 without the lower deck 14 in place. This allows clearance for the head 46 of each snap-pin 16 to engage a snap-pin opening in the upper deck 12, while the spaced apart tips 50 extend through the snap-pin receiving cavity 44 for engaging a backside 60 of the inner sleeve 42 associated therewith.

The spaced apart tips 50 of each snap-pin 16 resiliently extend outwards from the body 48 after having passed through the snap-pin receiving cavity 44 for engaging the backside 50 of the inner sleeve 42 associated therewith. The spaced apart tips 50 of each snap-pin 16 may be angled to facilitate insertion thereof through the snap-pin receiving cavity 44. The spaced apart tips 50 of each snap-pin comprise a respective lip 51 for engaging the backside of the inner sleeve. The respective lips 51 are configured to break off based on an excessive separation force applied between the upper and lower decks 12, 14. The snap-pins 16 are also formed out of plastic. Alternatively, the snap-pins 16 may be formed out any of the materials used to form the upper and lower decks 12, 14 as discussed in detail above.

Another aspect is directed to improving the durability of the pallet. This is accomplished by inserting sleeved reinforcing rods 80' into the upper and/or lower molds of the pallet 10' for the respective upper and/or lower decks 12', 14'. As readily appreciated by those skilled in the art, the sleeved reinforcing rods 80' are insert molded.

Figure 8:
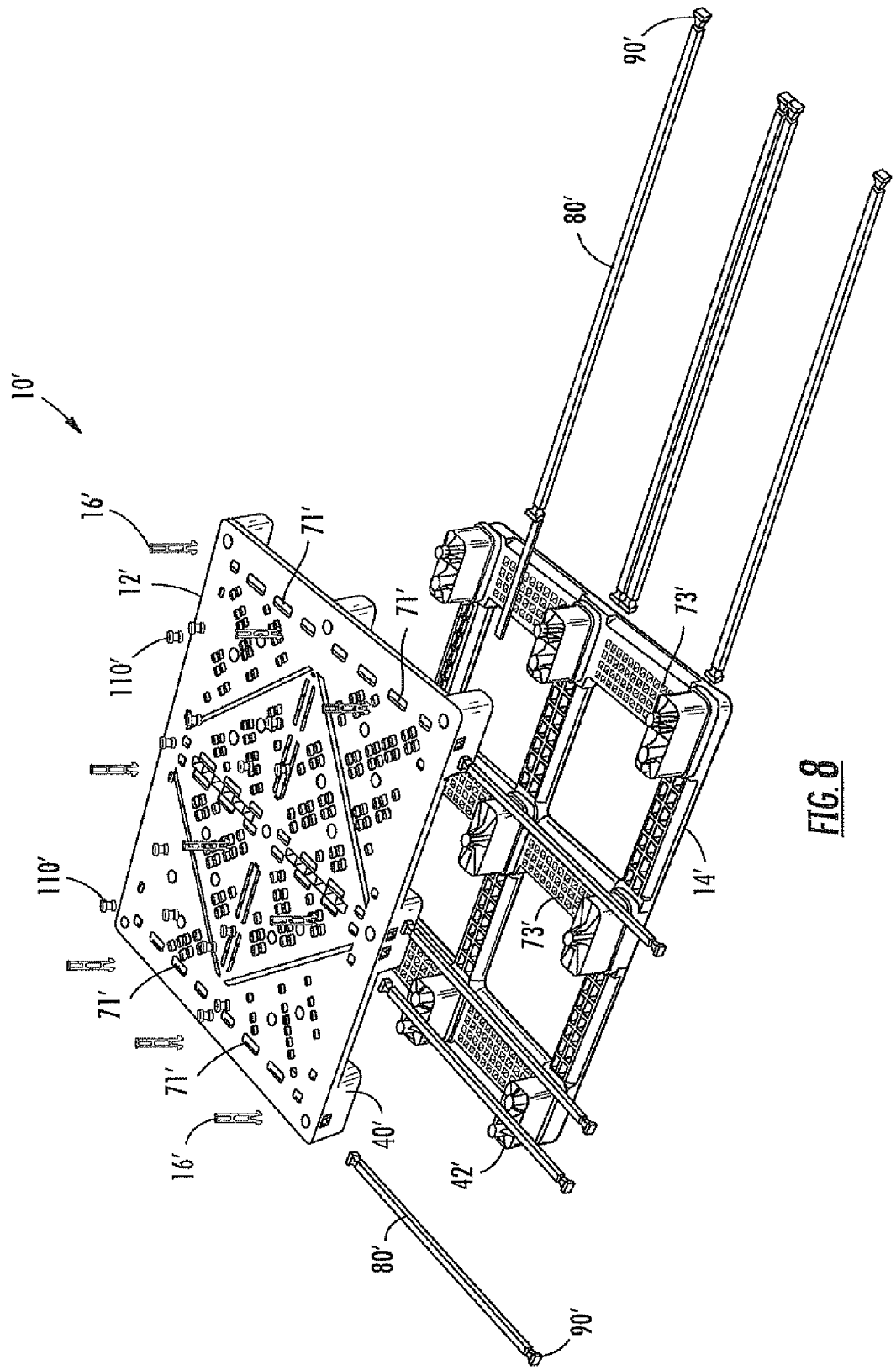
FIG. 8 is a perspective view of the pallet unassembled in accordance with the present invention.
Figure 9:
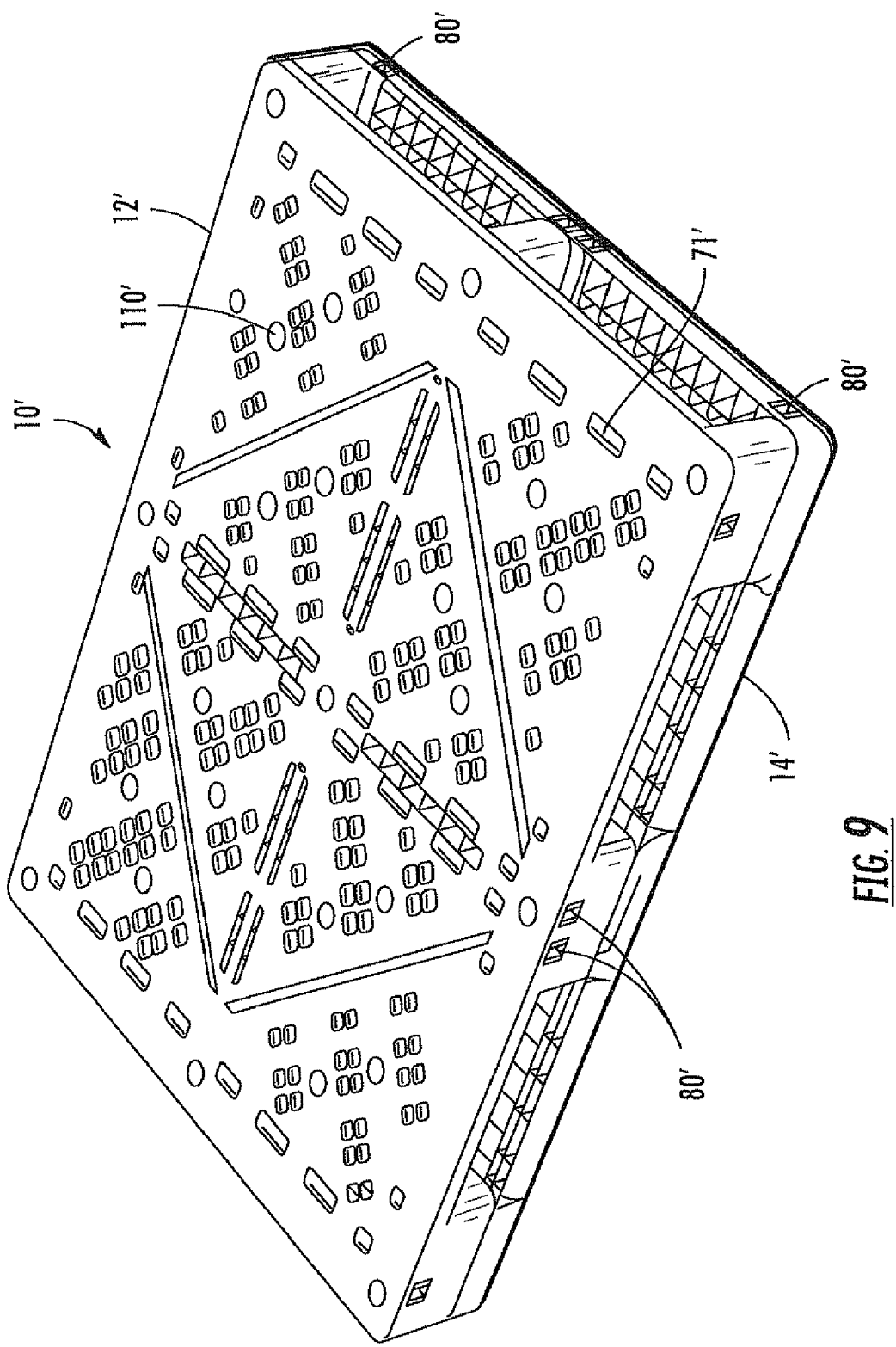
FIG. 9 is a perspective view of the pallet shown in FIG. 8 assembled.

As best illustrated by the exploded view of the pallet 10' in FIG. 8, four sleeved reinforcing rods 80' are used in the lower deck 14', and four sleeved reinforcing rods 80' are used in the upper deck 12'. The actual number of sleeved reinforcing rods 80' will vary depending on the size of the pallet 10' and its intended use, as well as on the actual number of support blocks 18', 18a'. As noted above, the sleeved reinforcing rods 80' may be in the lower deck 14' only, in the upper deck 12' only, or in both the upper and lower decks. For illustration purposes, both the upper and lower decks 12', 14' include sleeved reinforcing rods 80'. The assembled pallet 10' is illustrated in FIG. 9.

Figure 10:
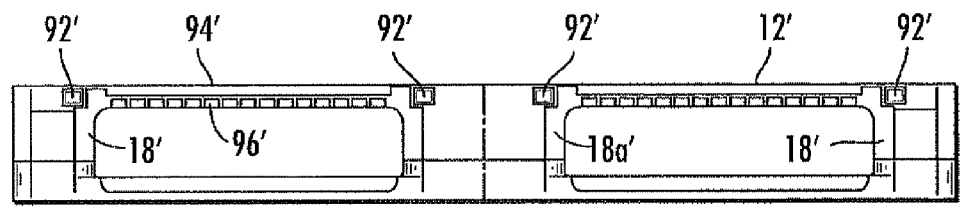
FIG. 10 is a side view of the pallet illustrating positioning of the channels in the upper deck in accordance with the present invention.

The upper deck 12' includes channels 92 between its top and bottom surfaces 94', 96', as illustrated in FIG. 10. The upper surface of the sleeved reinforcing rod 80' is below the top surface 94' of the upper deck 12', and is above the bottom surface 96' of the upper deck 12'. Each channel 92' extends from a side edge to an opposing side edge of the upper deck 12'.

Figure 11:
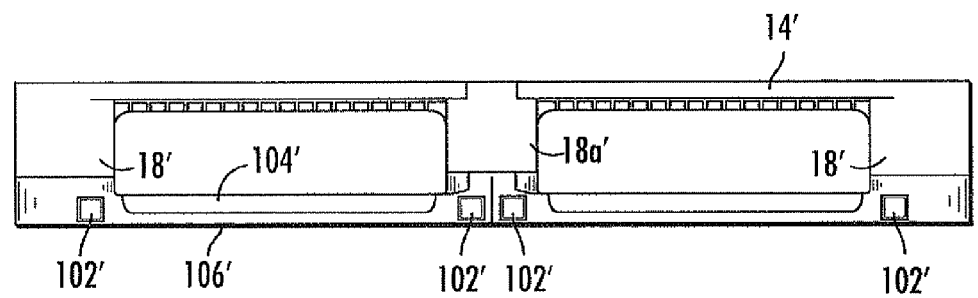
FIG. 11 is a side view of the pallet illustrating positioning of the channels in the lower upper deck in accordance with the present invention.

Similarly, the lower deck 14' includes channels 102' between its top and bottom surfaces 104', 106', as illustrated in FIG. 11. The upper surface of the sleeved reinforcing rod 80' is below the top surface 104' of the lower deck 14', and is above the bottom surface 106' of the lower deck 14'. Each channel 102' extends from a side edge to an opposing side edge of the lower deck 12'.

The illustrated channels 92', 102' are positioned so that they are on top or bottom of the support blocks 18', 18a'. The center support blocks 18a' may be wider than the other support blocks 18' so that the two sleeved reinforcing rods 80' in the channels 92' in the center portion of the upper deck 12' and the two sleeved reinforcing rods 80' in the channels 102' in the center portion of the lower deck 14' can each be supported by a support block yet still provide strength to the upper and lower decks. Alternatively, all of the support blocks 18', 18a' are the same size.

Figure 12:
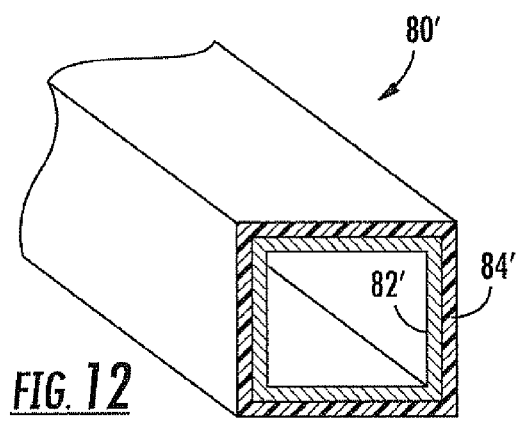
FIG. 12 is a cross-sectional view of a sleeved reinforcing rod in accordance with the present invention.

Referring now to FIG. 12, a sleeved reinforcing rod 80' comprises a reinforcing rod 82' having opposing ends and side surfaces therebetween, and a sleeve 84' enclosing the side surfaces of the reinforcing rod. The ends of the reinforcing rod 82' are exposed. The sleeved reinforcing rod 80' allows relative movement between the sleeve 84' and the reinforcing rod 82'.

The reinforcing rod 82' is made of metal, for example, and the sleeve 84' is made of plastic, for example. The metal may comprise steel. However, other types of metals may be used. Alternatively, the reinforcing rod 82' may comprise non-metal materials, such as reinforced fiberglass, for example.

As the pallet 10' is flexed or as the metal contracts, relative movement is needed between the reinforcing rod 82' and the plastic sleeve 84'. Consequently, the reinforcing rod 82' is simply not coated in plastic. Otherwise, the local plastic around the reinforcing rod 82' can be over stressed, resulting in cracks.

The illustrated reinforcing rod 82' has a rectangular shape, and is hollow so that an opening extends between the opposing ends thereof. In one embodiment, the sleeve 84' is extruded over the reinforcing rod 82' to form the sleeved reinforcing rod 80'. The shape of the reinforcing rod 82' may vary, and may even be filled in other embodiments. To assist with the relative movement between the reinforcing rod 82' and the sleeve 84', the reinforcing rod may comprise fluorine-containing polymers. Fluorine-containing polymers are also known as Teflon®, and includes the following: polytetrafluoroethylene (PTFE), perfluoroalkoxy (PFA) and fluorinated ethylene proplene (FEP).

Plastic pallet manufacturers typically add reinforcing rods to a pallet after the pallet is formed, as is the case for the prior art patents discussed in the background section. This requires the pallet to be molded first, and then add the reinforcing rods. In sharp contrast, the sleeved reinforcing rods 80' are inserted into the pallet mold before the upper and lower decks 12', 14' are formed therein.

The plastic of the sleeve 84' has a melting point that is slightly higher than the melting point of the plastic used to form the upper and lower decks 12', 14'. As a result, the outside surface of the sleeves 84' will partially melt or bond to the plastic of the upper and lower decks 12', 14' while still allowing movement of the reinforcing rods 82' therein. Alternatively, the melting point of the sleeve 64' is the same as the melting point of the upper and lower decks 12', 14', but cooling characteristics of the molten plastic during manufacturing still results in the outside surface of the sleeves 84' partially melting or bonding to the plastic of the upper and lower decks 12', 14' without melting down to the reinforcing rods 82'.

After the upper and lower decks 12', 14' have been formed with the sleeved reinforcing rods 80' therein, end caps 90' are used to enclose the ends of the reinforcing rods 82'. Alternatively, the ends of the sleeved reinforcing rods 80' may be closed as a result of being formed. If a plastic pallet 10' is to be recycled, the ends of the sleeve 84' are punctured or the end caps 90' are removed so that the reinforcing rod 82' can be removed therefrom for use in another pallet.

The upper and lower decks 12', 14' include additional holes 71', 73' for exposing the sleeved reinforcing rods 80'. This also allows the sleeves 84' to be punctured from the side to help in removing the reinforcing rods 82' therefrom.

The illustrated pallet 10' further includes friction plugs 110' to prevent a load from sliding over the top surface 94' of the upper deck 12'. The friction plugs 110' are inserted through corresponding openings in the upper deck 12' after the pallet 10' has been formed.

Figure 13:
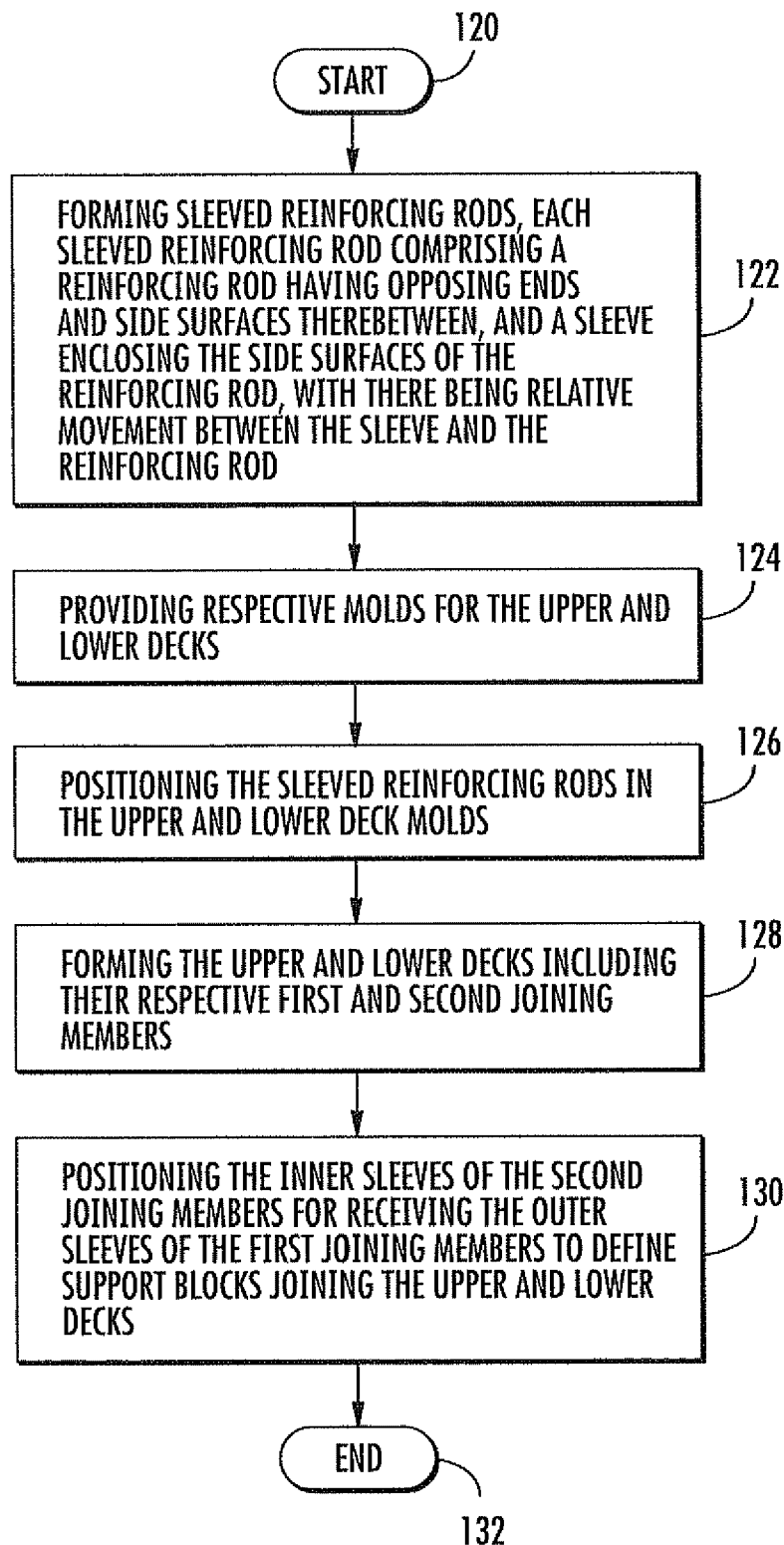
FIG. 13 is a flow chart illustrating a method for making a pallet in accordance with the present invention.

Another aspect is directed to a method for making a pallet 10' as described above. Referring now to the flow chart illustrated in FIG. 13, the method comprises from the start (Block 120), forming at Block 122 a plurality of sleeved reinforcing rods 80', with each sleeved reinforcing rod comprising a reinforcing rod 82' having opposing ends and side surfaces therebetween, and a sleeve 84' enclosing the side surfaces of the reinforcing rod. There is relative movement between the sleeve 84' and the reinforcing rod 82'.

The method further comprises providing respective molds for the upper and lower decks 12', 14' at Block 124, and positioning the sleeved reinforcing rods 80' in the respective decks at Block 126. The upper and lower decks 12', 14' including their respective first and second joining members 40', 42' are formed at Block 128. The inner sleeves of the second joining members 42' are positioned at Block 130 for receiving the outer sleeves of the first joining members 40' to define the support blocks 18', 18a' joining the upper and lower decks 12', 14'. The method ends at Block 132.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A method for making a pallet comprising an upper deck comprising material having a first melting point; a plurality of first joining members that project downwardly from the upper deck, each first joining member integrally molded with the upper deck and including an outer sleeve; a lower deck comprising material having the first melting point; a plurality of second joining members that project upwardly from the lower deck, each second joining member integrally molded with the lower deck and including an inner sleeve; at least one of the upper and lower decks including a plurality of channels between top and bottom surfaces thereof, the method comprising:

forming a plurality of sleeved reinforcing rods, each sleeved reinforcing rod comprising a reinforcing rod having opposing ends and side surfaces therebetween, and a sleeve enclosing the side surfaces of the reinforcing rod, with there being relative movement between each sleeve and corresponding reinforcing rod;

providing respective deck molds for the upper and lower decks;

positioning the plurality of sleeved reinforcing rods in at least one of the deck molds to define the plurality of channels therein, with each channel extending from a side edge to an opposing side edge of the at least one of the upper and lower decks allowing a reinforcing rod therein to be later removed from the channel;

forming the upper and lower decks including their respective first and second joining members, with the upper and lower decks each comprising material having a first melting point, and with each sleeve comprising material having a second melting point higher than the first melting point so that outer surfaces of the sleeves are partially melted to the material of the at least one of the upper and lower decks with the defined plurality of channels therein; and positioning the inner sleeves of the plurality of second joining members for receiving the outer sleeves of the plurality of first joining members to define a plurality of support blocks joining the upper and lower decks.

2. The method according to claim 1, wherein the plurality of channels is in both of the upper and lower decks so that the plurality of sleeved reinforcing rods are positioned in both of the upper and lower deck molds.

3. The method according to claim 2, wherein the sleeved reinforcing rods in the upper deck are orthogonal to the sleeved reinforcing rods in the lower deck.

4. The method according to claim 1, wherein each reinforcing rod is hollow so that an opening extends between the opposing open ends thereof; and further comprising inserting a plurality of end caps into the open ends of the plurality of sleeved reinforcing rods.

5. The method according to claim 1, wherein forming each sleeved reinforcing rod comprises extruding the sleeve over the reinforcing rod.

6. The method according to claim 1, wherein each reinforcing rod comprises fluorine-containing polymers.

7. The method according to claim 1, wherein the upper deck includes a plurality of snap-pin openings, with each outer sleeve projecting downwardly from the upper deck surrounding a respective snap-pin opening; wherein each second joining member projecting upwardly from the lower deck including a snap-pin receiving cavity positioned therein; and further comprising inserting a plurality of snap-pins into the plurality of snap-in openings in the upper deck, with each snap-pin extending through the snap-pin receiving cavity for engaging a backside of the inner sleeve associated therewith.

8. The method according to claim 1, wherein the upper and lower decks, the plurality of first and second joining members, and the sleeves comprise plastic.

9. A method for making a pallet comprising an upper deck; a plurality of first joining members that project downwardly from the upper deck, each first joining member including an outer sleeve; a lower deck; a plurality of second joining members that project upwardly from the lower deck, each second joining member including an inner sleeve; at least one of the upper and lower decks including a plurality of channels between top and bottom surfaces thereof, the method comprising:

forming a plurality of sleeved reinforcing rods, each sleeved reinforcing rod comprising a reinforcing rod having opposing ends and side surfaces therebetween, and a sleeve enclosing the side surfaces of the reinforcing rod, with there being relative movement between each sleeve and corresponding reinforcing rod;

providing respective deck molds for the upper and lower decks;

positioning the plurality of sleeved reinforcing rods in at least one of the deck molds to define the plurality of channels therein, with each channel extending from a side edge to an opposing side edge of the at least one of the upper and lower decks allowing a reinforcing rod therein to be later removed from the channel;

forming the upper and lower decks including their respective first and second joining members, so that the sleeve of each sleeved reinforcing rod is joined to at least one of the upper and lower decks during molding; and positioning the inner sleeves of the plurality of second joining members for receiving the outer sleeves of the plurality of first joining members to define a plurality of support blocks joining the upper and lower decks.

10. The method according to claim 9, wherein the plurality of channels is in both of the upper and lower decks so that the plurality of sleeved reinforcing rods are positioned in both of the upper and lower deck molds.

11. The method according to claim 10, wherein the sleeved reinforcing rods in the upper deck are orthogonal to the sleeved reinforcing rods in the lower deck.

12. The method according to claim 9, wherein each reinforcing rod is hollow so that an opening extends between the opposing open ends thereof; and further comprising inserting a plurality of end caps into the open ends of the plurality of sleeved reinforcing rods.

13. The method according to claim 9, wherein forming each sleeved reinforcing rod comprises extruding the sleeve over the reinforcing rod.

14. The method according to claim 9, wherein the at least one of the upper and lower decks including the plurality of channels comprises a material having a first melting point; and wherein each sleeve comprises a material having a second melting point higher than the first melting point.

15. The method according to claim 9, wherein each reinforcing rod comprises fluorine-containing polymers.

16. The method according to claim 9, wherein the upper deck includes a plurality of snap-pin openings, with each outer sleeve projecting downwardly from the upper deck surrounding a respective snap-pin opening; wherein each second joining member projecting upwardly from the lower deck including a snap-pin receiving cavity positioned therein; and further comprising inserting a plurality of snap-pins into the plurality of snap-in openings in the upper deck, with each snap-pin extending through the snap-pin receiving cavity for engaging a backside of the inner sleeve associated therewith.

17. The method according to claim 9, wherein the upper and lower decks, the plurality of first and second joining members, and the sleeves comprise plastic.

\* \* \* \* \*

UNITED STATES PATENT AND TRADEMARK OFFICE
CERTIFICATE OF CORRECTION

PATENT NO. : 8,141,500 B2
APPLICATION NO. : 12/056613
DATED : March 27, 2012
INVENTOR(S) : Naidu et al.

It is certified that error appears in the above-identified patent and that said Letters Patent is hereby corrected as shown below:

Column 10, Line 10

Delete: ", so that the sleeve of each sleeved reinforcing rod is joined to at least one of the upper and lower decks during molding: and"

Insert: -- . --

Signed and Sealed this
Tenth Day of July, 2012

David J. Kappos
*Director of the United States Patent and Trademark Office*